United States Patent
Stanjek et al.

(10) Patent No.: US 7,906,179 B2
(45) Date of Patent: Mar. 15, 2011

(54) PAINTS COMPRISING PARTICLES

(75) Inventors: Volker Stanjek, Ampfing (DE); Torsten Gottschalk-Gaudig, Mehring (DE); Juergen Pfeiffer, Burghausen (DE); Christoph Briehn, Munich (DE)

(73) Assignee: Wacker Chemie AG, Munich (DE)

( * ) Notice: Subject to any disclaimer, the term of this patent is extended or adjusted under 35 U.S.C. 154(b) by 517 days.

(21) Appl. No.: 11/996,414

(22) PCT Filed: Jun. 27, 2006

(86) PCT No.: PCT/EP2006/006207
§ 371 (c)(1), (2), (4) Date: Feb. 14, 2008

(87) PCT Pub. No.: WO2007/009557
PCT Pub. Date: Jan. 25, 2007

(65) Prior Publication Data
US 2008/0213488 A1    Sep. 4, 2008

(30) Foreign Application Priority Data

Jul. 22, 2005 (DE) .......................... 10 2005 034 350

(51) Int. Cl.
*B05D 3/00* (2006.01)

(52) U.S. Cl. ..................................... 427/385.5; 427/387

(58) Field of Classification Search ........................ None
See application file for complete search history.

(56) References Cited

U.S. PATENT DOCUMENTS

| | | | |
|---|---|---|---|
| 5,998,504 A | 12/1999 | Groth et al. | |
| 6,022,919 A | 2/2000 | Komoto | |
| 6,319,557 B1 * | 11/2001 | Ikushima et al. | 427/385.5 |
| 6,376,559 B1 | 4/2002 | Komoto | |
| 6,623,791 B2 * | 9/2003 | Sadvary et al. | 427/140 |
| 6,649,672 B1 | 11/2003 | Ducoffre et al. | |
| 6,750,270 B1 | 6/2004 | Klostermann et al. | |
| 2003/0008974 A1 | 1/2003 | Mehnert et al. | |
| 2003/0162015 A1 | 8/2003 | Vanier et al. | |
| 2003/0194550 A1 | 10/2003 | Perrine et al. | |
| 2006/0041035 A1 | 2/2006 | Poppe et al. | |
| 2006/0159923 A1 | 7/2006 | Becker-Willinger et al. | |
| 2007/0232729 A1 * | 10/2007 | Briehn et al. | 523/521 |

FOREIGN PATENT DOCUMENTS

| | | |
|---|---|---|
| CN | 1332212 A | 1/2002 |
| DE | 19933098 A | 1/2001 |
| DE | 10247359 A | 4/2004 |
| DE | 10326538 A | 1/2005 |
| EP | 0768351 A | 4/1997 |
| EP | 0832947 A | 4/1998 |
| EP | 0872500 A | 10/1998 |
| EP | 1187885 A | 3/2002 |
| EP | 1249470 A | 10/2002 |
| WO | WO 0075244 A | 12/2000 |
| WO | WO 0105897 A | 1/2001 |
| WO | WO 0109231 A | 2/2001 |
| WO | WO 03016370 A | 2/2003 |
| WO | WO 03044099 A | 5/2003 |

OTHER PUBLICATIONS

Patent Abstract corresponding to WO 03044099A.
Patent Abstract corresponding to WO 0316370A.
Determination of Specific Surface Area . . . Hydroxide G. W. Sears, Anal. Chem. 28 (1956) 1981, vol. 28. No. 12.

* cited by examiner

*Primary Examiner* — Erma Cameron
(74) *Attorney, Agent, or Firm* — Brooks Kushman P.C.

(57) ABSTRACT

Coating formulations suitable for demanding applications such as automotive clear and top coats contain a hydroxyl-functional film forming resin, an isocyanate or blocked isocyanate curative, and functionalized metal oxide particles, where >50% of the reactive functionalities are more reactive towards isocyanates than at least 60% of the hydroxyl groups of the film forming resin. Coatings prepared therefrom have excellent abrasion resistance, even with low filler content.

11 Claims, No Drawings

PAINTS COMPRISING PARTICLES

CROSS-REFERENCE TO RELATED APPLICATION

This application is the U.S. national phase of PCT Appln. No. PCT/EP2006/006207 filed Jun. 27, 2006, which claims priority to German Application No. 10 2005 034 350.3 filed Jul. 22, 2005.

BACKGROUND OF THE INVENTION

1. Field of the Invention

The invention relates to coating formulations comprising particles which on their surface possess isocyanate-reactive groups, and to their use as coating materials.

2. Description of the Related Art

Coating systems comprising particles—more particularly nanoparticles—are state of the art. Such coatings are described for example in EP 1 249 470, WO 03/16370, US 20030194550 or US 20030162015. The particles in these coatings lead to an improvement in the properties of the coatings, and more particularly with regard to their scratch resistance and also, where appropriate, their chemical resistance.

A frequently occurring problem associated with the use of the—generally inorganic—particles in organic coating systems consists in a usually inadequate compatibility between particle and coating-material matrix. This can lead to the particles being insufficiently dispersible in a coating-material matrix. Moreover, even well-dispersed particles may undergo settling in the course of prolonged standing or storage times, with the formation, possibly, of larger aggregates or agglomerates, which even on redispersion are then impossible or difficult to separate into the original particles. The processing of such inhomogeneous systems is extremely difficult in any case, and in fact is often impossible. Coating materials which, once applied and cured, possess smooth surfaces are generally not preparable by this route or are preparable only in accordance with cost-intensive processes.

It is therefore favorable to use particles which on their surface possess organic groups which lead to improved compatibility with the coating-material matrix. In this way the inorganic particle becomes "masked" by an organic shell. Particularly favorable coating-material properties can be achieved in this context if, furthermore, the organic functions on the particle surfaces are also reactive toward the coating-material matrix, so that under the respective curing conditions of the coating material in question they are able to react with the matrix. In this way, success is achieved in incorporating the particles into the matrix chemically in the course of coating-material curing, which often results in particularly good mechanical properties but also an improved chemical resistance. Systems of this kind are described for example in DE 102 47 359 A1, EP 832 947 A or EP 0 872 500 A1. A disadvantage of the systems described there are the generally relatively high levels of the comparatively expensive nanoparticles as a proportion of the coating material's overall solids content.

Also known, furthermore, is the use of coatings which comprise a binder which has been modified with nanoparticles. These coatings can be produced by reacting the particles, equipped with a reactive functionality, with a binder containing a complementary function. In this case, therefore, the organofunctional particle is incorporated chemically into the coating-material matrix not only at the coating-material curing stage but also even at the binder preparation stage. Systems of this kind are described for example in EP 1 187 885 A or WO 01/05897. They possess the disadvantage, however, of being relatively complicated to prepare, leading to high preparation costs.

In the case of one particularly important type of coating material, a film-forming resin is used which comprises hydroxyl-functional prepolymers, and more particularly hydroxyl-functional polyacrylates and/or polyesters, which on curing of the coating material are reacted with an isocyanate-functional curative (polyurethane coating materials) and/or with a melamine curative (melamine coating materials). The polyurethane coating materials are notable for particularly good properties. For instance, polyurethane coating materials possess in particular a superior chemical resistance, while the melamine coating materials generally possess better scratch resistances. These types of coating material are typically used in particularly high-value and demanding fields of application: for example, as clearcoat and/or topcoat materials for OEM paint systems in the automobile and vehicle industry. The majority of topcoat materials for automotive refinish also consist of systems of this kind. The film thicknesses of these coatings are typically situated in ranges from 20 to 50 μm.

In the case of the polyurethane coating systems, a distinction is generally made between what are called the 2K and the 1K systems. The former consist of two components, of which one is composed essentially of the isocyanate curative, while the film-forming resin with its isocyanate-reactive groups is contained in the second component. Both components in this case must be stored and transported separately and should not be mixed until shortly before they are processed, since the pot life of the completed mixture is greatly limited. Often more favorable, therefore, are the 1K systems, which consist of only one component, in which alongside the film-forming resin there is a curative with protected isocyanate groups. 1K coating materials are cured thermally, the protective groups of the isocyanate units being eliminated, and the deprotected isocyanates being able then to react with the film-forming resin. Typical baking temperatures of such 1K coating materials are 120-160° C. Melamine coating materials are generally 1K coating materials; the baking temperatures are typically situated in a comparable temperature range.

In the case of these high-value coating materials in particular, a further improvement in properties would be desirable. This is true more particularly of vehicle finishes. For instance, the attainable scratch resistance of conventional auto finishes, in particular, is still not sufficient, with the consequence, for example, that particles in the wash water in a carwash lead to significant marring of the finish. Over time, this causes lasting damage to the gloss of the finish. In this situation, formulations that allowed better scratch resistances to be achieved would be desirable.

One particularly advantageous way of achieving this object is to use particles having, on their surface, organic functions which are reactive toward the film-forming resin or else toward the curative. Moreover, these organic functions on the particle surface lead to masking of the particles and thus enhance the compatibility between particles and coating-material matrix.

Particles of this kind with suitable organic functions are already known in principle. They and their use in coatings are described for example in EP 0 768 351, EP 0 832 947, EP 0 872 500 or DE 10247359.

The scratch resistance of coatings can in fact be increased significantly through the incorporation of these kind of particles. However, in all of the methods of using these particles that have been described in the prior art, optimum results have still not been achieved. In particular, the corresponding coatings have such high particle contents that on grounds of cost alone it would be difficult to realize the use of such coating materials in large-scale production-line coating systems.

WO 01/09231 describes particle-containing coating systems characterized in that there are more particles located in a surface segment of the coating material than in a bulk segment. An advantage of this particle distribution is the comparatively low particle concentration which is needed for a marked improvement in scratch resistance. The desired high affinity of the particles for the surface of the coating material is achieved by applying a surface-active silicone resin agent to the particle surfaces. The modified particles obtainable in this way possess the relatively low surface energy often typical of silicones. As a consequence of this they arrange themselves preferentially at the surface of the film-forming matrix. A disadvantage of this method, however, is the fact that not only the silicone-resin modification of the particles but also the preparation of the silicone resins themselves that are required for that purpose are costly and complicated from a technical standpoint. A particular problem associated with the preparation of the silicone resins is the fact that the attainment of effective scratch resistance requires the silicone resins to be provided with organic functions, carbinol functions for example, via which the particles thus modified can be incorporated chemically into the coating material when the latter is cured. Silicone resins functionalized in this way are available commercially not at all or only to a very restricted degree. In particular, however, the selection of organic functions that are possible at all in the case of this system is relatively limited. For this system, therefore, as also for all of the other prior-art systems, optimum results have still not been achieved.

SUMMARY OF THE INVENTION

It was an object of the invention, therefore, to develop a coating system that overcomes the disadvantages of the prior art. These and other objects are achieved by providing a coating formulation containing a hydroxyl-functional film forming resin, a curative containing isocyanate groups or blocked isocyanate groups, and functionalized particles having isocyanate-reactive functionality, wherein >50% of the isocyanate reactive functionality possesses greater reactivity towards isocyanate groups than do at least 60% of the hydroxyl groups of the film forming resin.

DETAILED DESCRIPTION OF THE PREFERRED EMBODIMENT(S)

The invention provides coating formulations (B) which comprise
a) 20%-90% by weight, based on the solids fraction, of a hydroxyl-functional film-forming resin (L),
b) 1%-90% by weight, based on the solids fraction, of a coating curative (H) which contains free and/or protected isocyanate groups which on thermal treatment eliminate a protective group to release an isocyanate function,
c) 0.05%-40% by weight, based on the solids fraction, of particles (P) which on their surface possess isocyanate-reactive functions, with more than 50% of the reactive functions of the particles (P) possessing a greater reactivity toward isocyanates than do at least 60% of the hydroxyl groups of the film-forming resin (L), and
d) 0%-90% by weight, based on the overall coating formulation (B), of a solvent or a solvent mixture.

The solids fraction referred to comprises those components of the coating formulations (B) which remain in the coating material when the latter is cured.

The invention is based on the finding that the coatings produced from the coating formulations (B) of the invention in which a majority of the isocyanate-reactive groups of the particles (P) have a higher reactivity than do the majority of the hydroxyl groups of the film-forming resin (L) exhibit better scratch resistances than corresponding coatings in which the particles (P) and film-forming resin (L) possess isocyanate-reactive functions having largely identical reactivity.

A higher reactivity of the isocyanate-reactive groups of the particles (P) exists when the particles (P), exclusively or as a majority, possess primary, carbon-bonded hydroxyl functions, while the hydroxyl-functional film-forming resin (L) possesses, exclusively or as a majority, secondary hydroxyl groups. A higher reactivity of the isocyanate-reactive groups of the particles (P) likewise exists when the particles (P) possess, exclusively, or as a majority, carbon-bonded amine functions or thiol functions, while the hydroxyl-functional film-forming resin (L) possesses, exclusively or as a majority, hydroxyl groups. Particular preference is given to using particles (P) with aliphatic amine functions, since the latter exhibit a particularly high reactivity toward isocyanates.

Preferred coating formulations (B) are those comprising particles (P) at least 70%, and more preferably at least 90%, of whose isocyanate-reactive groups possess a higher reactivity toward isocyanates than do at least 60% of the hydroxyl groups of the film-forming resin (L). Likewise preferred are film-forming resins (L) of whose isocyanate-reactive groups not only 60%, but instead at least 70%, and with particular preference at least 90%, possess a lower reactivity toward isocyanates than do the isocyanate-reactive functions of the particles (P). With particular preference, all of the isocyanate-reactive groups of the particles (P) in the coating formulation (B) have a higher reactivity toward isocyanates than do all of the isocyanate-reactive groups of the film-forming resin (L).

The coating formulations (B) preferably contain, in addition to the coating curative (H), 0%-50% by weight, based on the solids fraction, of one or more further coating curatives (H1).

The coating formulations (B) are used preferably as clearcoat and/or topcoat materials, more particularly for automotive OEM finishes or automotive refinishes.

In one preferred embodiment of the invention coating formulations (B) contain
a) 30%-80% by weight, based on the solids fraction, of a hydroxyl-functional film-forming resin (L),
b) 10%-60% by weight, based on the solids fraction, of a coating curative (H),
c) 0.1%-30% by weight, based on the solids fraction, of particles (P),
d) 0%-40% by weight, based on the solids fraction, of one or more further coating curatives (H1), and
e) 10%-70% by weight, based on the overall coating formulation (B), of one or more solvents.

With particular preference the coating formulations (B) contain
a) 40%-70% by weight, based on the solids fraction, of a hydroxyl-functional film-forming resin (L),
b) 15%-50% by weight, based on the solids fraction, of a coating curative (H),
c) 0.5%-15% by weight, based on the solids fraction, of particles (P),
d) 0%-30% by weight, based on the solids fraction, of one or more further coating curatives (H1), and e) 10%-70% by weight, based on the overall coating formulation (B), of one or more solvents.

The fraction of the solvent or solvents as a proportion of the overall coating formulation (B) is preferably 10% to 60% by weight, more preferably 10%-40% by weight.

The amount of particles (P) is preferably 0.1%-40% by weight, based on the solids fraction, more preferably 0.2%-20% by weight or 0.2%-10% by weight. In especially advantageous embodiments of the invention the amount of particles (P) is 0.5%-5% by weight, based on the solids fraction, more particularly 0.7%-3% by weight.

The film-forming resin (L), particles (P), coating curative (H), and—if present—coating curatives (H1) preferably possess a sufficient number of reactive groups for a three-dimensionally crosslinked polymer network to be formed when the coating formulation (B) is cured.

In one preferred embodiment of the invention the particles (P) are obtainable by reacting particles (P1) composed of atoms selected from metal atoms, silicon atoms, and oxygen atoms, or of silicone resins, and possessing free hydroxyl functions with organosilanes (A) selected from the general formulae (I) and (II)

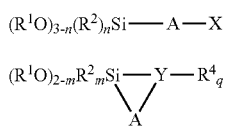

(I)

(II)

where
$R^1$ denotes hydrogen or alkyl, cycloalkyl or aryl radicals having in each case 1 to 6 C atoms, it being possible for the carbon chain to be interrupted by nonadjacent oxygen, sulfur or $NR^3$ groups,
$R^2$ denotes alkyl, cycloalkyl, aryl or arylalkyl radicals having in each case 1 to 12 C atoms, it being possible for the carbon chain to be interrupted by nonadjacent oxygen, sulfur or $NR^3$ groups,
$R^3$, $R^7$ denote hydrogen or alkyl, cycloalkyl, aryl, arylalkyl, aminoalkyl or aspartate ester radicals,
$R^4$ denotes hydrogen or an alkyl radical having 1 to 10 carbon atoms,
A denotes a divalent, optionally substituted alkyl, cycloalkyl or aryl radical having 1-10 carbon atoms, which optionally may be interrupted by oxygen, sulfur or $NR^3$ groups,
X denotes an organic function which on curing of the coating is able to enter into a chemical reaction with the curative (H), and is hydroxyl, thiol, $NHR^7$, a heterocyclic ring containing an NH function, or epoxide function, and
Y denotes an organic function which on curing of the coating—where appropriate after the cleavage of the Si—Y bond—is able to enter into a chemical reaction with the curative (H), and
n is able to adopt the values 0, 1 or 2,
m is able to adopt the values 0, 1 or 2, and
q is able to adopt the values 0 or 1.

In the organosilanes (A) groups $R^1$ are preferably methyl or ethyl radicals. Groups $R^2$ are preferably alkyl radicals having 1-6 carbon atoms or phenyl radicals, and more particularly are methyl, ethyl or isopropyl radicals. $R^3$ has preferably not more than 10 carbon atoms, more particularly not more than 4 carbon atoms. $R^4$ is preferably hydrogen or an alkyl radical having 1-10, more preferably having 1-6, carbon atoms, and in particular methyl or ethyl radicals. A is preferably a divalent alkyl radical having 1-6 carbon atoms, which may where appropriate be interrupted by oxygen, sulfur or $NR^3$ groups. With more particular preference A is a $(CH_2)_3$ group or a $CH_2$ group.

X is a hydroxyl or thiol function, a group of the formula $NHR^7$, a heterocylic ring containing an NH function, or an epoxide ring. $R^7$ has the definition of $R^3$. If X is an epoxide ring, then it is opened, before, during or after the reaction of the silane (A) with the particles (P1), by means of a suitable method, as by a reaction with ammonia, an amine, water or an alcohol or an alkoxide, for example.

Where silanes (A) of the general formula (II) are used in the preparation of particles (P), the ring structure of this silane is opened, during particle preparation, by the attack of a hydroxyl group of the particles (P1) on the silicon atom of the silane (A), with cleavage of the Si—Y bond. Y in this case is preferably a function which, following this cleavage of the Si—Y bond, represents a hydroxyl or thiol function or a group of the formula $NHR^7$.

Particular preference is given in this context to using organosilanes (A) which conform to the general formulae (III) or (IIIa)

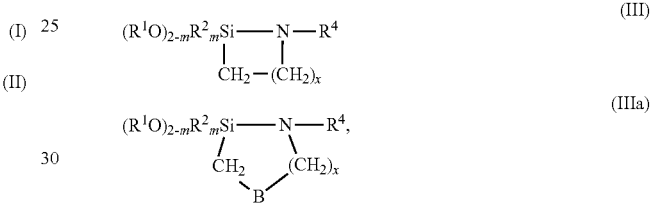

where
B is an oxygen atom, a sulfur atom, a carbonyl group, an ester group, an amide group or a group $NR^8$,
$R^8$ has the definitions of $R^3$,
x can adopt the values from 0 to 10,
and the remaining variables have the definitions given for the general formulae (I) and (II).

Very particular preference is given to using, as organosilanes (A), compounds of the general formulae (IV) or (V)

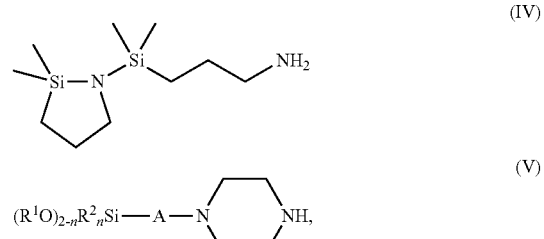

where all of the variables have the definitions given above.

In the preparation of the particles (P) it is possible, for the surface modification of the particles (P1), to make use not only of the organosilanes (A) but also of any desired mixtures of the silanes (A) with other silanes (S1), silazanes (S2) or siloxanes (S3). The silanes (S1) possess either hydroxysilyl groups or else hydrolyzable silyl functions, the latter being preferred. These silanes may additionally possess further organic functions, although silanes (S1) without further organic functions can also be used. Silazanes (S2) and siloxanes (S3) used are with particular preference hexamethyldisilazane and hexamethyldisiloxane, respectively. The weight fraction of the silanes (A) as a proportion of the total amount formed by the silanes (A) and (S1), silazanes (S2), and siloxanes (S3), is preferably at least 50% by weight, more preferably at least 70% by weight or 90% by weight. In one further particularly preferred embodiment of the invention no compound(s) (S1), (S2) or (S3) are used at all.

Particles (P1) which can be used are all metal oxide particles and mixed metal oxide particles (e.g., aluminum oxides such as corundum, mixed aluminum oxides of other metals and/or silicon, titanium oxide, zirconium oxides, iron oxides), silicon oxide particles (e.g., fumed silica, precipitated silica, colloidal silica) or silicon oxide compounds in which some of the valences of the silicon carry organic radicals, i.e., silicone resins. These particles (P1) are notable for the fact that on their surface they possess metal hydroxide and/or silicon hydroxide functions via which a reaction can take place with the organosilanes (A)—and also, where appropriate, the silanes (S1), silazanes (S2) or siloxanes (S3). The particles (P1) preferably possess an average diameter of 1 nm to 100 μm, preferably of 10 nm to 500 nm, more preferably of 10 nm to 200 nm. These average particle diameters can be determined, for example, by means of TEM micrographs or else as hydrodynamic equivalent diameters by means of photon correlation spectroscopy.

In one preferred embodiment of the invention the particles (P) are prepared starting from particles (P1) which are composed of colloidal silicon oxides or metal oxides, which in general take the form of a dispersion of the corresponding oxide particles of submicron size in an aqueous or nonaqueous solvent. In this case the oxides that can be used include those of the metals aluminum, titanium, zirconium, tantalum, tungsten, hafnium or tin. Particular preference is given to using organic solutions of colloidal silica sols. These are, generally, a dispersion of silicon dioxide particles in an aqueous or nonaqueous solvent. In general the silica sols are 1%-50% strength by weight solutions, preferably 20%-40% strength by weight solutions. Sols of this kind are available commercially and are sold by numerous manufacturers (e.g., DuPont, Nalco Chemical Company, Nissan Chemicals, etc.). Typical solvents are water, but include more particularly alcohols, especially alcohols having 1 to 6 carbon atoms—frequently isopropanol but also other alcohols, usually of low molecular mass, such as methanol, ethanol, n-propanol, n-butanol, isobutanol, and tert-butanol. Also available are organosols in polar aprotic solvents, such as methyl ethyl ketone, or aromatic solvents, such as toluene, for example. The average particle size of the silicon dioxide particles (P1) is generally 1-100 nm, preferably 5-50 nm, more preferably 8-30 nm.

The preparation of the particles (P) from colloidal silicon oxides or metal oxides can take place in accordance with a variety of methods. Preferably, however, it takes place by addition of the silanes (A)—where appropriate in a solvent and/or in mixtures with other silanes (S1), silazanes (S2) or siloxanes (S3)—to the aqueous or organic sol. This sol is, where appropriate, stabilized acidically, as by hydrochloric or trifluoroacetic acid, for example, or basically, as by ammonia, for example. The reaction takes place in general at temperatures of 0-200° C., preferably at 20-80°, and more preferably at 20-60° C. The reaction times are typically 5 minutes to 48 hours, preferably 1 to 24 hours. Optionally it is also possible to add acidic, basic or heavy-metal catalysts. These are used preferably in traces <1000 ppm. With particular preference, however, no separate catalysts at all are added.

Since colloidal silicon oxide or metal oxide sols often take the form of an aqueous or alcoholic dispersion, it may be advantageous to replace the solvent or solvents, during or after the preparation of the particles (P), by another solvent or by another solvent mixture. This can be done, for example, by distillative removal of the original solvent, with it being possible for the new solvent or solvent mixture to be added in one step or else in two or more steps before, during or else not until after the distillation. Suitable solvents in this context may include, for example, water, aromatic or aliphatic alcohols, preference being given to aliphatic alcohols, more particularly to aliphatic alcohols having 1 to 6 carbon atoms (e.g., methanol, ethanol, n-propanol, isopropanol, n-butanol, isobutanol, tert-butanol, the various regioisomers of pentanol and of hexanol), esters (e.g., ethyl acetate, propyl acetate, butyl acetate, butyl diglycol acetate, methoxypropyl acetate), ketones (e.g., acetone, methyl ethyl ketone), ethers (e.g., diethyl ether, tert-butyl methyl ether, THF), aromatic solvents (toluene, the various regioisomers of xylene, and also mixtures such as solvent naphtha), lactones (e.g., butyrolactone, etc.) or lactams (e.g., N-methylpyrrolidone). Preference is given here to aprotic solvents or to solvent mixtures which consist exclusively or else at least in part of aprotic solvents. Aprotic solvents have the advantage that any residues of solvent which remain in the coating material after it has been cured are unreactive toward the isocyanate functions released following the elimination of the protective groups. As well as preparing a particle dispersion, consideration could also be given to isolating the particles (P) in solid form.

Preference is likewise given, moreover, when preparing the particles (P) to using silicone resins of the general formula (VI)

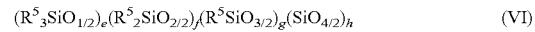

$$(R^5{}_3SiO_{1/2})_e(R^5{}_2SiO_{2/2})_f(R^5SiO_{3/2})_g(SiO_{4/2})_h \qquad (VI)$$

as particles (P1), where

R5 denotes a function $OR^1$, an OH function, or an optionally halogen-, hydroxyl-, amino-, phosphonato-, carbamato-, epoxy-, thiol-, (meth)acrylic-, or else NCO-substituted hydrocarbon radical having 1-18 carbon atoms, e denotes a value greater than or equal to 0, f denotes a value greater than or equal to 0, g denotes a value greater than or equal to 0, h denotes a value greater than or equal to 0, and the sum of e+f+g+h denotes at least one value of at least 1, preferably at least 5.

Preferably at least 70 mol % of all the radicals $R^5$ are methyl, ethyl, isopropyl or phenyl radicals.

In one preferred embodiment, for the silicone resins of the general formula (VI), the sum of e+h is at least 90 mol % of the sum of e+f+g+h.

The preparation of the particles (P) from silicone resins of the general formula (VI) and silanes (A) can take place by way of the processes described above.

Another preferred process for preparing the particles (P) does not start from hydroxyl-containing particles (P1). Instead, the particles (P) are prepared via cohydrolysis of the organosilanes (A) with other silanes (S4). As the silanes (S4) it is possible in this case to use all hydrolyzable silanes and also hydroxysilyl-containing silanes. It is also possible to employ siloxanes or silazanes as well. Preference is given to using silanes of the general formula (III) in this case. Typical examples of suitable silanes (S4) are tetraethoxysilane, tetramethoxysilane, methyl-trimethoxysilane, phenyltrimethoxysilane, methyl-triethoxysilane, phenyltriethoxysilane, dimethyl-dimethoxysilane, dimethyldiethoxysilane, trimethyl-methoxysilane or trimethylethoxysilane. It will be appreciated that different mixtures of different silanes (S4) can also be used. In that case it is possible to use not only mixtures which as well as the silanes (A) contain only silanes (S4) without additional organic functions, but also mixtures which as well as the silanes (A) also contain silanes (S4)

without an additional organic function and silanes (S4) with additional organic function. For the preparation of particles (P) by cohydrolysis, the various silanes can be added together or else successively. A further process for preparing the particles (P) consists in equilibrating organopolysiloxane resins with the silanes (A). The cohydrolysis and the equilibration can both be carried out in the presence of catalysts. The processes in principle of the cohydrolysis and equilibration for the preparation of resins are much described in the literature.

A further preferred process prepares the particles (P) starting from particles (P1) which are composed of fumed silica. This is silica which is prepared in a flame reaction from organosilicon compounds, as from silicon tetrachloride or methyltrichlorosilane, for example, or hydrogenotrichlorosilane or hydrogeno-methyldichlorosilane, or other methylchlorosilanes or alkylchlorosilanes, either as they are or in a mixture with hydrocarbons, or any desired volatilizable or sprayable mixtures of organosilicon compounds, as specified, and hydrocarbons, in a hydrogen-oxygen flame, for example, or else in a carbon monoxide-oxygen flame.

The unmodified fumed silica (P1) has a specific BET surface area, measured in accordance with DIN EN ISO 9277/DIN 66132, of 10 m$^2$/g to 600 m$^2$/g, preferably of 50 m$^2$/g to 400 m$^2$/g.

The unmodified fumed silica preferably has a surface silanol group (SiOH) density of less than 2.5 SiOH/nm$^2$, more preferably less than 2.1 SiOH/nm$^2$, yet more preferably of less than 2 SiOH/nm$^2$, and most preferably of 1.7 to 1.9 SiOH/nm$^2$, determined in accordance with a method as given in G.W. Sears, Anal. Chem. 28 (1956) 1981.

The unmodified fumed silica preferably has a tapped density, measured in accordance with DIN EN ISO 787-11, of 10 g/l to 500 g/l, more preferably of 20 g/l to 200 g/l, and with particular preference of 30 g/l to 100 g/l.

The preparation of the particles (P) from fumed silica can take place by a variety of processes.

In one preferred process the dry fumed silica in powder form is reacted directly with the ultrafinely divided silanes (A)—where appropriate in mixtures with other silanes (S1), silazanes (S2) or siloxanes (S3).

The process may be carried out continuously or discontinuously and may be composed of one or more steps. The modified fumed silica is preferably prepared by means of a process in which the preparation takes place in separate steps: (A) first, preparation of the hydrophilic fumed silica, (B) modification of the hydrophilic fumed silica with (1) loading of the hydrophilic fumed silica with silanes (A), (2) reaction of the fumed silica with the applied compounds, and (3) purification of the fumed silica to remove compounds applied in excess and elimination products.

The surface treatment is preferably carried out in an atmosphere with less than 10% by volume of oxygen, more preferably less than 2.5% by volume, the best results being obtained at less than 1% by volume of oxygen.

Coating, reaction, and purification can be carried out as a discontinuous or continuous operation.

Coating (step B1) takes place at temperatures of −30 to 250° C., preferably 20 to 150°, more particularly 20 to 80° C.; in one specific embodiment the coating step takes place at 30 to 50° C.

The residence time is 1 minute to 24 hours, preferably 15 minutes to 240 minutes, and with particular preference, for reasons of the space-time yield, 15 minutes to 90 minutes.

The pressure in the coating stage ranges from a slight underpressure of down to 0.2 bar up to an overpressure of 100 bar, with preference being given for technical reasons to standard pressure—that is, unpressurized operation relative to external/atmospheric pressure.

The silanes A and/or mixtures thereof are added preferably in liquid form and more particularly are mixed into the powder-form metal oxide. These compounds may be admixed in pure form or as solutions in known solvents employed in the art, such as alcohols, examples being methanol, ethanol or isopropanol, ethers, examples being diethyl ether, THF or dioxane, or hydrocarbons, examples being hexanes or toluene. The concentration in the solution in this case is 5%-95% by weight, preferably 30%-95% by weight, more preferably 50%-95% by weight.

The admixing takes place preferably by means of nozzle techniques or comparable techniques, for example effective atomization techniques such as atomizing in 1-fluid nozzles under pressure (preferably 5 to 20 bar), spraying in 2-fluid nozzles under pressure (preferably gas and liquid 2-20 bar), ultrafine division with atomizers or gas/solid exchange assemblies with moving, rotating or static internals which allow homogeneous distribution of the silanes (A) with the powder-form fumed silica.

The silanes (A) are preferably added in the form of an ultrafinely divided aerosol, the aerosol having a settling velocity of 0.1-20 cm/s.

The loading of the silica and the reaction with the silanes A take place preferably with mechanical or gas-supported fluidization. Mechanical fluidization is particularly preferred. Gas-supported fluidization can take place by means of all inert gases, preferably such as N$_2$, Ar, other noble gases, CO$_2$, etc. The fluidizing gases are preferably supplied preferably in the region of superficial gas velocities of 0.05 to 5 cm/s, more preferably of 0.5-2.5 cm/s.

Particular preference is given to the mechanical fluidization which takes place without additional employment of gas beyond that used for inertization, by means of paddle stirrers, anchor stirrers, and other suitable stirring elements.

The reaction takes place preferably at temperatures of 40 to 200° C., preferably 40-160° C., and more preferably at 80 to 150° C. The reaction time amounts to 5 minutes to 48 hours, preferably 10 minutes to 4 hours.

Where appropriate it is possible to add protic solvents, such as liquid or vaporizable alcohols or water; typical alcohols are isopropanol, ethanol and methanol. It is also possible to add mixtures of the abovementioned protic solvents. It is preferred to add 1% to 50% by weight of protic solvents relative to the metal oxides, more preferably 5% to 25%. Water is particularly preferred.

Optionally it is possible to add acidic catalysts, of acidic character in the sense of a Lewis acid or of a Brønsted acid, such as hydrogen chloride, or basic catalysts, of basic character in the sense of a Lewis base or of a Brønsted base, such as ammonia or amines, such as triethylamine. These catalysts are preferably added in traces, i.e., less than 1000 ppm. With particular preference no catalysts are added.

Purification takes place preferably at a purification temperature of 20 to 200° C., preferably 50° C. to 180° C., more preferably of 50 to 150° C. The purification step is preferably characterized by agitation, with particular preference being given to slow agitation and a low level of mixing. The stirring elements are advantageously set and moved in such a way that, preferably, mixing and fluidization, but not complete vortexing, occur.

The purification step may additionally be characterized by an increased gas input, corresponding to a superficial gas velocity of preferably 0.001 to 10 cm/s, more preferably 0.01 to 1 cm/s. This can be by means of all inert gases, such as preferably N$_2$, Ar, other noble gases, CO$_2$, etc.

In addition, during the modification or subsequent to the purification, it is possible to employ methods of mechanical compaction of the silica, such as, for example, press rollers, milling assemblies, such as edge runner mills and such as ball mills, continuous or batch, compaction by means of screws or worm mixers, worm compactors, briquetting machines, or compaction by suction withdrawal of the air or gas present, by means of appropriate vacuum methods.

Particular preference is given to mechanical compaction during modification, in step B2 of the reaction, by means of press rollers, abovementioned milling assemblies, such as ball mills, or compaction by means of screws, worm mixers, worm compactors, or briquetting machines.

In a further particularly preferred procedure the purification is followed by deployment of methods for the mechanical compaction of the silica, such as compaction by suction withdrawal of the air or gas present, by means of appropriate vacuum methods, or press rollers, or combinations of both methods.

Additionally, in one particularly preferred procedure, the purification is followed by deployment of methods for the deagglomeration of the silica, such as pinned-disk mills, hammer mills, opposed-jet mills, impact mills or milling/classifying devices.

In a further preferred process, dispersions of the hydrophilic fumed silica in water or typical solvents employed industrially, for example alcohols such as methanol, ethanol, and isopropanol, ketones such as acetone and methyl ethyl ketone, ethers such as diethyl ether and THF, hydrocarbons such as pentane and hexanes, aromatics such as toluene, or other volatile solvents such as hexamethyldisiloxane, or mixtures thereof are reacted with silanes (A).

The process may be carried out continuously or batchwise and may be composed of one or more steps. Preference is given to a continuous process. The modified fumed silica is preferably prepared by means of a process in which the silica (1) is mixed in one of the abovementioned solvents, (2) is reacted with the silanes (A), and (3) is freed from solvents, excess silanes, and by-products.

The dispersion (1), reaction (2), and drying (3) are preferably carried out in an atmosphere containing less than 10% by volume of oxygen, more preferably less than 2.5% by volume, the best results being obtained at less than 1% by volume of oxygen.

The mixing (1) may take place by means of typical mixing assemblies, such as anchor stirrers or cross-arm stirrers. Where appropriate, mixing may be accompanied by high shearing by means of dissolvers, rotor-stator assemblies, where appropriate with direct metering into the shearing gap, by means of ultrasonic transducers or by means of milling assemblies, such as ball mills. Where appropriate, a variety of the abovementioned assemblies may be used, in parallel or in succession.

For the reaction (2) of the silanes (A) with the silica, the silanes are added in pure form or as a solution in suitable solvents to the silica dispersion and the components are mixed homogeneously. The silanes (A) may be added in the vessel which is used for preparing the dispersion or in a separate reaction vessel. Where the silanes are added in the dispersing vessel, this may take place in parallel with or after the end of the dispersing operation. Where appropriate the silanes (A) in solution in the dispersing medium may be added directly in the dispersing step.

Where appropriate, water is added to the reaction mixture. Where appropriate, acidic catalysts, such as Brønsted acids, such as liquid or gaseous HCl, sulfuric acid, phosphoric acid or acetic acid, or basic catalysts, such as Brønsted bases, such as liquid or gaseous ammonia, amines such as $NEt_3$ or NaOH, are added to the reaction mixture. The reaction step is carried out at a temperature of 0° C. to 200° C., preferably 10° C. to 180° C., and more preferably of 20° C. to 150° C.

The removal of solvents, excess silanes (A), and by-products (3) may take place by means of dryers or by spray drying. The drying step may where appropriate be followed by a heating step for the purpose of completing the reaction.

Additionally, following the drying operation, methods for the mechanical compaction of the silica may be deployed, such as, for example, press rollers, milling assemblies, such as edge runner mills and such ball mills, continuous or batch, compaction by means of screws or worm mixers, worm compactors, briquetting machines, or compaction by suction withdrawal of the air or gas present, by means of suitable vacuum methods.

In a further particularly preferred procedure the drying is followed by deployment of methods for the mechanical compaction of the silica, such as compaction by suction withdrawal of the air or gas present, by means of appropriate vacuum methods, or press rollers, or combinations of both methods.

Additionally, in one particularly preferred procedure, the drying is followed by deployment of methods for the deagglomeration of the silica, such as pinned-disk mills, hammer mills, opposed-jet mills, impact mills or milling/classifying devices.

In the case of one particularly advantageous embodiment of the invention the particles (P) are prepared using silanes (A) of the general formula (I) or (V) in which the spacer A stands for a $CH_2$ bridge, or else cyclic silanes of the formulae (III), (IIIa) or (IV). These silanes are notable for a particularly high level of reactivity toward the hydroxyl groups of the particles (P1), so that the functionalization of the particles can be carried out particularly quickly and at low temperatures, more particularly even at room temperature.

Where silanes (A) are used that only possess monofunctional silyl functions, i.e., silanes of the general formulae (I), (II), (III), (IIIa), (IV) or (V) with n and/or m=2, then there is no need to add water when preparing the particles (P), since the monoalkoxysilyl groups or the reactive cyclic silanes respectively, are able to react directly with the hydroxyl functions on the surface of the particles (P1). Where, in contrast, silanes (A) having difunctional or trifunctional silyl groups are used, (i.e., silanes of the general formulae (I), (II), (III), (IIIa), (IV), (IVa) or (VI) with n and/or m=0 or 1), then the presence or addition of water during the preparation of the particles (P) is often advantageous, since in that case the alkoxysilanes are able to react not only with the Si—OH functions of the particles (P1) but also—after their hydrolysis—with one another. This produces particles (P) which possess a shell composed of intercrosslinked silanes (A).

The film-forming resins (L) included in the coating formulations (B) of the invention are composed preferably of hydroxyl-containing prepolymers, more preferably of hydroxyl-containing polyacrylates or polyesters. Hydroxyl-containing polyacrylates and polyesters of this kind that are suitable for coating-material preparation are sufficiently well known to the skilled worker and are widely described in the relevant literature. They are produced and sold commercially by numerous manufacturers.

The coating formulations (B) may be one-component (1K) or else two-component (2K) coating materials. In the first case, the coating curatives (H) used are compounds which possess protected isocyanate groups. In the second case, the coating curatives (H) used are compounds having free isocyanate groups.

Both 1K and 2K coating materials use, as their isocyanates, common di- and/or polyisocyanates, which where appropriate have been provided beforehand with the respective protective groups. In this case it is possible in principle to use all customary isocyanates of the kind widely described in the literature. Common diisocyanates are, for example, diisocyanatodiphenyl-methane (MDI), not only in the form of crude or technical MDI but also in the form of pure 4,4'- and/or 2,4'-isomers or mixtures thereof, tolylene diisocyanate (TDI) in the form of its different regioisomers, diisocyanatonaphthalene (NDI), isophorone diisocyanate (IPDI), perhydrogenated MDI (H-MDI), tetramethylene diisocyanate, 2-methylpentamethylene diisocyanate, 2,2,4-trimethylhexamethylene diisocyanate, dodecamethylene diisocyanate, 1,4-diisocyanatocyclohexane, 1,3-diisocyanato-4-methylcyclohexane or else hexamethylene diisocyanate (HDI). Examples of polyisocyanates are polymeric MDI (P-MDI), triphenylmethane triisocyanate, and also all isocyanurate trimers or biuret trimers of the diisocyanates listed above. In addition it is also possible to use further oligomers of the abovementioned isocyanates with blocked NCO groups. All of the di- and/or polyisocyanates may be used individually or else in mixtures. Preference is given to using the isocyanurate trimers and biuret trimers of the comparatively UV-stable aliphatic isocyanates, with particular preference the trimers of HDI and IPDI.

Where isocyanates with protected isocyanate groups are used as coating curatives (H), preference is given to protective groups which are eliminated at temperatures of 80 to 200° C., with particular preference at 100 to 170° C. Protective groups which can be used include secondary or tertiary alcohols, such as isopropanol or tert-butanol, CH-acidic compounds, such as diethyl malonate, acetylacetone, ethyl acetoacetate, oximes, such as formaldoxime, acetaldoxime, butane oxime, cyclohexanone oxime, acetophenone oxime, benzophenone oxime or diethylene glyoxime, lactams, such as caprolactam, valerolactam, butyrolactam, phenols, such as phenol, o-methylphenol, N-alkyl amides, such as N-methylacetamide, imides, such as phthalimide, secondary amines, such as diisopropylamine, imidazole, 2-isopropylimidazole, pyrazole, 3,5-dimethylpyrazole, 1,2,4-triazole, and 2,5-dimethyl-1,2,4-triazole, for example. Preference here is given to using protective groups such as butane oxime, 3,5-dimethylpyrazole, caprolactam, diethyl malonate, dimethyl malonate, ethyl acetoacetate, diisopropylamine, pyrrolidone, 1,2,4-triazole, imidazole, and 2-isopropylimidazole. Particular preference is given to using protective groups which allow a low baking temperature, such as diethyl malonate, dimethyl malonate, butane oxime, diisopropylamine, 3,5-dimethylpyrazole and 2-isopropyl-imidazole, for example.

The ratio of isocyanate groups—blocked or otherwise—to the isocyanate-reactive groups of film-forming resin (L) and particles (P) in the coating formulation (B) of the invention is typically 0.5 to 2, preferably 0.8 to 1.5, and with particular preference 1.0 to 1.2.

Where the coating formulation (B) comprises 1K coating materials, the coating curative (H) with protected isocyanate groups can also be used in combination with further coating curatives (H1). The amounts in which this additional coating curative (H1) are used are more particularly 0%-50% by weight, preferably 0%-40% by weight, and especially 0%-30% by weight, based on the solids fraction. The coating curatives (H1) are preferably compounds which are able to enter into addition reactions or condensation reactions with the film-forming resin and also, where appropriate, the particles (P) at the baking temperatures of a 1K coating material of preferably 100-200° C. With particular preference they are melamine-formaldehyde resins and/or tris(aminocarbonyl) triazines.

It is possible, furthermore, for the coating formulations (B) further to comprise the common solvents and also the additives and coating components that are typical in coating formulations, as a further component. Instances of these might include flow control assistants, surface-active substances, adhesion promoters, light stabilizers such as UV absorbers and/or free-radical scavengers, thixotroping agents, and further solids. Additions of this kind are generally unavoidable in order to produce the particular profiles of properties that are desired both in the coating formulations (B) and also in the cured coatings. The coating formulations (B) may also comprise pigments.

In the case of one preferred process the coating formulations (B) of the invention are produced by adding the particles (P), during the mixing operation, in the form of a powder or a dispersion, in a suitable solvent. In addition, however, a further process is preferred wherein first of all a masterbatch is produced from the particles (P) and from one or more coating-material components, having particle concentrations >15% by weight, preferably >25% by weight, and more preferably >30% by weight. In the preparation of the coating formulations (B) of the invention, this masterbatch is then mixed with the remaining coating-material components. Where a particle dispersion forms the starting point for the preparation of the masterbatch, it can be advantageous for the solvent of the particle dispersion to be removed in the course of the masterbatch preparation process, by way of a distillation step, for example, or else replaced by another solvent or solvent mixture.

The coating formulations (B) of the invention can be used to coat any desired substrates for the purpose of enhancing the scratch resistance, abrasion resistance or chemical resistance. Preferred substrates are plastics such as polycarbonate, polybutylene terephthalate, polymethyl methacrylate, polystyrene or polyvinyl chloride, and also basecoat materials applied in an upstream step.

With particular preference the coatings produced from coating formulations (B) of the invention serve as scratch-resistant clearcoat or topcoat materials, more particularly in the vehicle industry. The coating formulations (B) can be applied by any desired methods such as immersion, spraying, and pouring methods. Also possible is the application of the coating formulation (B) to a basecoat by a wet in wet process. Curing is generally accomplished by heating under the particular conditions required (2K coating material typically at 0-100° C., preferably at 20-80° C.; 1K coating material at 100-200° C., preferably at 120-160° C.). It will be appreciated that curing of the coating material may be accelerated through the addition of suitable catalysts. Suitable catalysts in this case are more particularly acidic compounds, basic compounds, and compounds containing heavy metals.

All of the symbols in the above formulae have their definitions in each case independently of one another. In all of the formulae the silicon atom is tetravalent.

Unless indicated otherwise, all quantity and percentage figures are based on the weight, all pressures are 0.10 MPa (abs.), and all temperatures are 20° C.

EXAMPLES

Synthesis Example 1

Preparation of a Silane (Silane 1) Having a Secondary Carbinol Function by Reacting Glycidyloxypropyltrimethoxysilane with Lithium Methoxide

A mixture of 5.00 g (22.7 mmol) of 3-glycidyloxypropyltrimethoxysilane and 22.7 mmol of lithium methoxide (2 M in methanol) is heated at reflux for 5 h. The product is exclusively a silane with a secondary hydroxyl function. After cooling to room temperature, the mixture is admixed with 0.20 g of ion-exchange resin (Amberlyst 15) and stirred at room temperature for 30 min, and the ion-exchange resin is filtered off and then the solvent is removed by distillation. This gives 5.22 g of a colorless oil.

Synthesis Example 2

Preparation of N-butyl-1,1-dimethyl-1-sila-2-azacyclopentane (silane 2)

An initial charge of 508 g (6.94 mol) of 1-butylamine is admixed dropwise over the course of 2.5 h with 171 g (1.00 mol) of chloropropyldimethylchlorosilane and the mixture is heated at reflux for 12 h. Following distillative removal of the excess 1-butylamine, the residue is diluted with 350 ml of toluene and cooled to 10° C. The precipitate it forms is filtered off and the filtrate is distilled in vacuo. This gives 134.5 g of N-butyl-1,1-dimethyl-1-sila-2-azacyclopentane.

Synthesis Example 3

Preparation of N-triethoxysilyl-methylpiperazine (silane 3)

905.3 g (10.5 mol) of piperazine and 945 ml of xylene (anhydrous) as solvent are charged to a 4 liter 4-neck flask and subsequently innertized with nitrogen. The batch is heated to a temperature of 100° C., in the course of which the piperazine dissolves completely. Added dropwise at this temperature are 446.3 g (2.1 mol) of chloromethyltriethoxysilane, over the course of 1 h with thorough stirring. Following the addition of about ⅓ of the amount of silane, piperazine hydrochloride is precipitated as a salt, but the suspension remains readily stirrable until the end of the reaction. After the end of the addition, stirring is continued for a further 15 min. Subsequently the reaction mixture is heated to 110° C. and the precipitated salt is filtered off on a preheated filter.

The batch is cooled to about 5° C. and the piperazine excess precipitated at this temperature is filtered off. Subsequently the solvent is removed by distillation, with any piperazine residues still present likewise being removed. The crude product thus obtained is purified by distillation (84-86° C. at 0.1 mbar). A yield of 357.5 g (1.36 mol) is achieved, i.e., about 65% based on the amount of silane used.

Synthesis Example 4

Preparation of $sio_2$ Nanosol Particles with Secondary Carbinol Functions

At a temperature of 25° C., 3.50 g of an $SiO_2$ organosol (IPA-ST® from Nissan Chemicals, 30.5% by weight of $SiO_2$ in isopropanol, average particle size 12 nm) are admixed with 13.5 g of isopropanol, 0.03 g of water, and 0.10 g (0.40 mmol) of silane 1. The batch is stirred at room temperature for 24 h, giving a largely clear suspension which exhibits a slight Tyndall effect. It has a solids content of 6.71% by weight, an $SiO_2$ content of 6.23% by weight, and an OH group content of 0.023 mmol/g.

Synthesis Example 5

Preparation of aminoalkyl-functional $SiO_2$ Nanosol Particles

11.0 g of a dilute silica sol obtained by adding 7.5 g of isopropanol to 3.5 g of the silica sol IPA-ST® from Nissan Chemicals (30.5% by weight $SiO_2$ in isopropanol, average particle size 12 nm) is rapidly admixed dropwise with a solution of 0.085 g of the silane 2, described in synthesis example 2, in 0.4 g of ethanol, and the reaction mixture is stirred at room temperature for 1 h. The modified silica sol, which exhibits a slight Tyndall effect, has a solids content of 10.0% by weight, an $SiO_2$ content of 9.3% by weight, and an NH group content of 0.04 mmol/g.

Synthesis Example 6

Preparation of aminoalkyl-functional $SiO_2$ Nanosol Particles

11.0 g of a dilute silica sol obtained by adding 7.5 g of isopropanol to 3.5 g of the silica sol IPA-ST® from Nissan Chemicals (30.5% by weight $SiO_2$ in isopropanol, average particle size 12 nm) is rapidly admixed dropwise with a solution of 0.095 g of the silane 3, described in synthesis example 3, in 0.4 g of ethanol, and the reaction mixture is stirred at room temperature for 1 h. The modified silica sol, which exhibited a slight Tyndall effect, has a solids content of 9.7% by weight, an $SiO_2$ content of 9.3% by weight, and an amine content of 0.03 mmol/g.

Synthesis Example 7

Preparation of aminoalkyl-functional Fumed Silica Particles

At a temperature of 25° C. under $N_2$ inert gas, 100 g of hydrophilic silica, having a moisture content <1% and an HCl content <100 ppm and having a specific surface area of 300 $m^2/g$ (measured by the BET method in accordance with DIN 66131 and 66132) (obtainable under the name Wacker® HDK T30 from Wacker-Chemie GmbH, Munich, D) are admixed, by atomization via a one-fluid nozzle (pressure 5 bar), with 5 g of water and 48 g of aminopropyltrimethoxysilane. The silica thus loaded is further fluidized by means of stirring, with a residence time of 0.25 hour at a temperature of 25° C., and is subsequently reacted at 80° C. in a 100 l drying chamber under $N_2$ with a residence time of 2 h.

The product is a white silica powder with a homogeneous layer of silylating agent.

Synthesis Example 8

Preparation of aminoalkyl-functional Fumed Silica Particles in Dispersion

In a 2 l three-neck flask with KPG stirrer, dropping funnel and reflux condenser, under $N_2$, a mixture of 880 ml of acetone and 220 ml of water is admixed with 100 g of hydrophilic silica, having a moisture content <1% and an HCl content <100 ppm and having a specific surface area of 300 m²/g (measured by the BET method in accordance with DIN 66131 and 66132) (obtainable under the name Wacker® HDK T30 from Wacker-Chemie GmbH, Munich, D). The mixture is heated to boiling with stirring, and 48 g of aminopropyltrimethoxysilane are slowly added dropwise. The resulting reaction mixture is heated under reflux for a further 2 h and then all of the volatile fractions are removed on a rotary evaporator. The white powder residue is subsequently heated at 80° C. in a 100 l drying chamber under $N_2$ with a residence time of 2 h.

The product is a white silica powder with a homogeneous layer of silylating agent.

Comparative Example 1 and 2

Preparation of 1K coating Formulations Comprising $sio_2$ Nanosol Particles which Have been Modified with Secondary Sarbinol Functions (Not Inventive)

To prepare a coating formulation, an acrylate-based paint polyol having a solids content of 52.4% by weight (solvents: solvent naphtha, methoxypropyl acetate (10:1)), a hydroxyl group content of 1.46 mmol/g resin solution, and an acid number of 10-15 mg KOH/g is mixed with Desmodur® BL 3175 SN from Bayer (butane oxime-blocked polyisocyanate, blocked NCO content of 2.64 mmol/g). The amounts of the respective components that are used can be found in table 1. Subsequently the amounts indicated in table 1 of the dispersions prepared in accordance with synthesis example 4 are added. In this case molar ratios of protected isocyanate functions to hydroxyl groups of approximately 1.1:1 are achieved in each case. Furthermore, in each case, 0.01 g of a dibutyltin dilaurate and 0.03 g of a 10% strength solution of ADDID® 100 from Tego AG (polysiloxane-based flow control assistant) in isopropanol are admixed, giving coating formulations having approximately 50% solids content. These mixtures, which initially are still slightly turbid, are stirred at room temperature for 4 h, giving clear coating formulations.

TABLE 1

Formulas of the coating materials (comparative examples 1-2)

| | Polyacrylic polyol | Desmodur® BL 3175 SN | Nanosol from synthesis example 4 | Particle content* |
|---|---|---|---|---|
| Comparative example 1[1] | 4.50 g | 2.73 g | (0.0 g) | 0.0% |
| Comparative example 2[1] | 4.50 g | 2.76 g | 2.76 g | 3.9% |

*Fraction of the particles of synthesis example 4 as a proportion of the total solids content of the respective coating formulation
[1] not inventive Examples 1-4

Preparation of 1K Coating Formulations Comprising SiO2 Nanosol Particles which have been Modified with Aminoalkyl Functions To prepare an inventive coating formulation, an acrylate-based paint polyol having a solids content of 52.4% by weight (solvents: solvent naphtha, methoxypropyl acetate (10:1)), a hydroxyl group content of 1.46 mmol/g resin solution, and an acid number of 10-15 mg KOH/g is mixed with Desmodur® BL 3175 SN from Bayer (butane oxime-blocked polyisocyanate, blocked NCO content of 2.64 mmol/g). The amounts of the respective components that are used can be found in table 2. Subsequently the amounts indicated in table 2 of the dispersions prepared in accordance with synthesis example 5 or 6 (see table 2) are added. In this case molar ratios of protected isocyanate functions to hydroxyl or amine groups of approximately 1.1:1 are achieved in each case. Furthermore, in each case, 0.01 g of a dibutyltin dilaurate and 0.03 g of a 10% strength solution of ADDID® 100 from Tego AG (polysiloxane-based flow control assistant) in isopropanol are admixed, giving coating formulations having approximately 50% solids content. These mixtures, which initially are still slightly turbid, are stirred at room temperature for 4 h, giving clear coating formulations.

TABLE 2

Formulas of the coating materials (example 1-4)

| | Polyacrylic polyol | Desmodur® BL 3175 SN | Nanosol from | Particle content* |
|---|---|---|---|---|
| Example 1 | 4.50 g | 2.75 g | Synthesis example 5 (0.62 g) | 1.4% |
| Example 2 | 4.50 g | 2.76 g | Synthesis example 5 (1.25 g) | 2.7% |
| Example 3 | 4.00 g | 2.44 g | Synthesis example 6 (0.60 g) | 1.5% |
| Example 4 | 4.00 g | 2.45 g | Synthesis example 6 (1.20 g) | 2.9% |

*Fraction of the particles of synthesis example 5 or 6 as a proportion of the total solids content of the respective coating formulation Examples 5-6

Preparation of 1K Coating Formulations Comprising Fumed Silica Particles Modified with Aminoalkyl Functions To prepare an inventive coating, 85.6 g of Desmophen® A 365 BA/X from Bayer (acrylate-based paint polyol having a hydroxyl group content of 1.71 mmol OH/g) are mixed with 63.3 g of Desmodur® BL 3175 SN from Bayer (methyl ethyl ketone oxime-blocked polyisocyanate, blocked NCO content approximately 11%). This corresponds to a molar ratio of protected isocyanate functions to hydroxyl groups of 1.1:1. Additionally, 0.5 g of a 50% strength dibutyltin dilaurate solution (in methyl ethyl ketone) and 0.1 g of ADDID® 100 from Tego AG (polysiloxane-based flow control assistant) and also 31.5 g of methyl ethyl ketone are mixed in, giving a coating formulation having an approximately 50% solids content.

Example 5: Incorporated into the resulting mixture by means of a dissolver are 18 g of the fumed silica modified with aminoalkyl groups and obtained from synthesis example 7, and the product is subsequently finely dispersed in a bead mill for 30 min, giving a clear coating formulation.

Example 6: Incorporated into the resulting mixture by means of a dissolver are 18 g of the fumed silica modified with aminoalkyl groups and obtained from synthesis example 8, and the product is subsequently finely dispersed in a bead mill for 30 min, giving a clear coating formulation.

Production and Evaluation of Coating Films from the Coating Formulations of Examples 1-6 and of Comparative Examples 1-2.

The coating materials from comparative example 1 and also from examples 1-4 are each knife-coated onto a glass plate using a Coatmaster® 509 MC film-drawing device from Erichsen, with a knife having a slot height of 120 μm. Subsequently the coating films obtained are dried in a forced-air drying chamber at 70° C. for 30 minutes and then at 150° C. for 30 min. Both from the coating formulations of the examples and from the comparative examples, coatings are obtained which are visually flawless and smooth.

The gloss of the coatings is determined using a Micro gloss 20° gloss meter from Byk and for all of the coating formulations is between 159 and 164 gloss units. The scratch resistance of the cured coating films thus produced is determined using a Peter-Dahn abrasion-testing instrument. For this purpose a Scotch Brite® 2297 abrasive pad with an area of 45×45 mm is loaded with a weight of 500 g. Using this loaded pad, the coating specimens are scratched with a total of 50 strokes. Both before the beginning and after the end of the scratching tests, the gloss of the respective coating is noted using a Micro gloss 20° gloss meter from Byk.

As a measure of the scratch resistance of the respective coating, the loss of gloss in comparison to the initial value is ascertained:

TABLE 3

Loss of gloss in the Peter-Dahn scratch test

| Coating sample | Loss of gloss |
| --- | --- |
| Comparative example 1[1)] | 72% |
| Comparative example 2[1)] | 61% |
| Example 1 | 46% |
| Example 2 | 41% |
| Example 3 | 45% |
| Example 4 | 31% |
| Example 5 | 25% |
| Example 6 | 29% |

[1)]not inventive

Examples 7-8 and Comparative Example 3

Preparation of 2K Coating Formulations Comprising SiO$_2$ Nanosol Particles Modified with Aminoalkyl Functions To prepare a coating formulation, an acrylate-based paint polyol having a solids content of 52.4% by weight (solvents: solvent naphtha, methoxypropyl acetate (10:1)), a hydroxyl group content of 1.46 mmol/g resin solution, and an acid number of 10-15 mg KOH/g is mixed with the nanosol prepared in synthesis example 6. The amounts of the respective components used are indicated in table 4. The resulting dispersion, which initially is still slightly turbid, is stirred at room temperature for approximately 2 h, giving a clear and storage-stable mixture.

Directly before it is used, this film-forming resin component is mixed with Desmodur® BL 3390 BA/SN from Bayer (polyisocyanate, NCO content of 4.63 mmol/g) as curative component. The amounts of the respective components used can be found in table 4. In each case, molar ratios of isocyanate functions to hydroxyl or amine groups of approximately 1.1:1 are achieved. Furthermore, in each case 0.01 g of a dibutyltin dilaurate and 0.03 g of a 10% strength solution of ADDID® 100 from Tego AG (polysiloxane-based flow control assistant) in isopropanol are mixed in, giving coating formulations having approximately 50% solids content.

TABLE 4

Formulas of the coating materials (example 1-4)

| | Polyacrylic polyol | Desmodur® BL 3175 SN | Nanosol from synthesis example 6 | Particle content* |
| --- | --- | --- | --- | --- |
| Comparative example 3[1)] | 4.00 g | 1.39 g | 0.00 g | 0.0% |
| Example 7 | 4.00 g | 1.39 g | 0.55 g | 1.6% |
| Example 8 | 4.00 g | 1.40 g | 1.10 g | 3.2% |

*Fraction of the particles of synthesis example 5 or 6 as a proportion of the total solids content of the respective coating formulation
[1)]not inventive Production and Evaluation of Coating Films from the Coating Formulations of Examples 7-8 and of Comparative Example 3.

Directly after the respective combining of film-forming resin component and coating curative component, the coating materials from comparative example 3 and also from examples 7-8 are each knife-coated onto a glass plate using a Coatmaster® 509 MC film-drawing device from Erichsen, with a knife having a slot height of 120 μm. Subsequently the coating films obtained are dried in a forced-air drying chamber at 80° C. for 30 minutes. Both from the coating formulations of examples 7-8 and from that of comparative example 3, coatings are obtained which are visually flawless and smooth.

The gloss of the coatings is determined using a Micro gloss 20° gloss meter from Byk and for all of the coating formulations is between 159 and 164 gloss units. The scratch resistance of the cured coating films thus produced is determined using a Peter-Dahn abrasion-testing instrument. For this purpose a Scotch Brite® 2297 abrasive pad with an area of 45×45 mm is loaded with a weight of 500 g. Using this loaded pad, the coating specimens are scratched with a total of 50 strokes. Both before the beginning and after the end of the scratching tests, the gloss of the respective coating is noted using a Micro gloss 20° gloss meter from Byk.

As a measure of the scratch resistance of the respective coating, the loss of gloss in comparison to the initial value is ascertained:

TABLE 5

Loss of gloss in the Peter-Dahn scratch test

| Coating sample | Loss of gloss |
| --- | --- |
| Comparative example 3[1)] | 82% |
| Example 7 | 47% |
| Example 8 | 41% |

[1)]not inventive

The invention claimed is:
1. A coating formulation (B), comprising:
 a) 20%-90% by weight, based on the solids fraction, of at least one hydroxyl-functional film-forming resin (L),
 b) 1%-90% by weight, based on the solids fraction, of at least one coating curative (H) which contains free and/or protected isocyanate groups which on thermal treatment eliminate a protective group to release an isocyanate function, c) 0.05%-40% by weight, based on the solids fraction, of particles (P) which on their surface bear isocyanate-reactive functions, with more than 50% of the reactive functions of the particles (P) possessing a greater reactivity toward isocyanates than do at least 60% of the hydroxyl groups of the film-forming resin(s) (L), and d) 0%-90% by weight, based on the overall coating formulation (B), of a solvent or a solvent mixture, wherein the particles (P) are surface-modified fumed silica particles, colloidal silica particles, or surface-modified silicone resin particles.

2. The coating formulation (B) of claim 1, wherein the particles (P) possess carbon-bonded amine functions or thiol functions.

3. The coating formulation (B) of claim 1, comprising:
a) 30%-80% by weight, based on the solids fraction, of at least one hydroxyl-functional film-forming resin (L),
b) 10%-60% by weight, based on the solids fraction, of at least one coating curative (H),
c) 0.1%-30% by weight, based on the solids fraction, of particles (P),
d) 0%-40% by weight, based on the solids fraction, of one or more further coating curatives (H1), and
e) 20%-70% by weight, based on the overall coating formulation (B), of one or more solvents.

4. The coating formulation (B) of claim 1, wherein the particles (P) are obtained by reacting particles (P1) of fumed silica atoms or particles (P1) of silicone resins, the particles (P1) bearing free hydroxyl functions, with at least one organosilane (A) of the formulae (I) and (II)

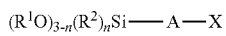  (I)

  (II)

where $R^1$ each individually denotes hydrogen or alkyl, cycloalkyl or aryl radicals having in each case 1 to 6 C atoms, the carbon chain of the alkyl, cycloalkyl, or aryl radicals optionally interrupted by nonadjacent oxygen, sulfur or $NR^3$ groups, $R^2$ each individually denotes alkyl, cycloalkyl, aryl or arylalkyl radicals having in each case 1 to 12 C atoms, carbon chain of the alkyl, cycloalkyl, aryl, or arylalkyl radical optionally interrupted by nonadjacent oxygen, sulfur or $NR^3$ groups, $R^4$ each individually denotes hydrogen or an alkyl radical having 1-10 carbon atoms, A each individually denotes a divalent, optionally substituted alkyl, cycloalkyl or aryl radical having 1-10 carbon atoms, which is optionally interrupted by oxygen, sulfur or $NR^3$ groups, X each individually denotes a hydroxyl or thiol function, a group of formula $NHR^7$, a heterocyclic ring containing an NH function, or an epoxide ring, Y each individually denotes an organic function which after the cleavage of the Si—Y bond represents a hydroxyl or thiol function or a group of formula $NHR^7$, $R^3$, $R^7$ each individually denote hydrogen, alkyl, cycloalkyl, aryl, arylalkyl, aminoalkyl or aspartate ester radicals, and n is 0, 1 or 2, m is 0, 1 or 2, and q is 0 or 1.

5. The coating formulation (B) of claim 1, wherein the particles (P1) possess an average diameter of 1 nm to 100 μm.

6. The coating formulation (B) of claim 1, wherein the particles (P) are prepared starting from particles (P1) which comprise colloidal silica particles.

7. The coating formulation (B) of claim 1, wherein the particles (P) are prepared starting from fumed silica particles (P1).

8. The coating formulation (B) of claim 1, wherein the film-forming resins (L) comprise hydroxyl-containing polyacrylates or hydroxyl-containing polyesters.

9. The coating formulation (B) of claim 1, wherein particles (P) are present in an amount of from 0.5 to 5 weight percent based on total solids of the coating formulation.

10. A process for coating a substrate, comprising applying a coating formulation (B) of claim 1 to the substrate, and curing the coating formulation.

11. The coating formulation (B) of claim 1, wherein the particles (P1) are silicone resin particles.

* * * * *

UNITED STATES PATENT AND TRADEMARK OFFICE
CERTIFICATE OF CORRECTION

PATENT NO. : 7,906,179 B2  
APPLICATION NO. : 11/996414  
DATED : March 15, 2011  
INVENTOR(S) : Volker Stanjek Page 1 of 1

It is certified that error appears in the above-identified patent and that said Letters Patent is hereby corrected as shown below:

Column 22, Line 42, Claim 11:

Delete "particles (P1)" and insert -- particles (P) --.

Signed and Sealed this  
Twenty-sixth Day of April, 2011

David J. Kappos  
*Director of the United States Patent and Trademark Office*